United States Patent [19]
Carroll et al.

[11] Patent Number: 6,049,807
[45] Date of Patent: Apr. 11, 2000

[54] TECHNIQUE FOR MAINTAINING OBJECT INTEGRITY DURING MODIFICATION OF A PERSISTENT STORE OF OBJECTS

[75] Inventors: Randy W. Carroll; Martin P. Nally, both of Raleigh; Lawrence Scott Rich, Apex, all of N.C.

[73] Assignee: International Business Machines Corporation, Armonk, N.Y.

[21] Appl. No.: 08/922,629

[22] Filed: Sep. 3, 1997

[51] Int. Cl.[7] .............................. G06F 12/16; G06F 17/30
[52] U.S. Cl. ......................... 707/201; 707/202; 707/203
[58] Field of Search ............................... 707/8, 103, 201, 707/203, 9, 200, 202

[56] References Cited

U.S. PATENT DOCUMENTS

| | | | |
|---|---|---|---|
| 5,301,319 | 4/1994 | Thurman et al. | 395/600 |
| 5,440,735 | 8/1995 | Goldring | 707/1 |
| 5,701,457 | 12/1997 | Fujiwara | 707/8 |
| 5,706,505 | 1/1998 | Fraley et al. | 395/614 |
| 5,710,920 | 1/1998 | Maruyama et al. | 395/614 |
| 5,727,203 | 3/1998 | Hapner et al. | 395/614 |
| 5,729,739 | 3/1998 | Cantin et al. | 395/614 |
| 5,809,507 | 9/1998 | Cavanagh, III | 707/103 |
| 5,819,306 | 10/1998 | Goldman et al. | 711/100 |

*Primary Examiner*—Paul V. Kulik
*Attorney, Agent, or Firm*—Gregory M. Doudnikoff

[57] ABSTRACT

A technique for maintaining the integrity of data maintained in an object in a persistent store of objects. When a modification event is initiated during a transaction to modify an object, a copy of the object is created. Modifications are made to the copy of the object, and the original object remains available to be accessed with its original value. The modifications to the copy of the object can be reviewed, or further modifications can be made to the copy before the modifications are committed and the changes to the copy applied to the original object and thus available to all users of the persistent store. Alternatively, the modification event can be canceled prior to commitment and never be made available via the persistent store.

8 Claims, 8 Drawing Sheets

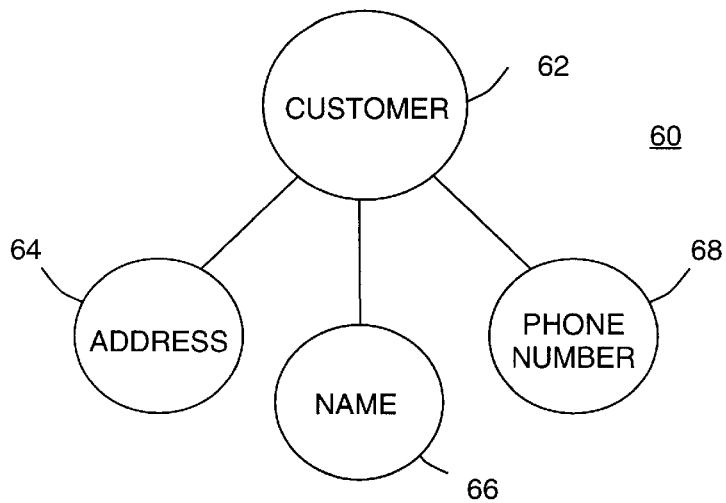
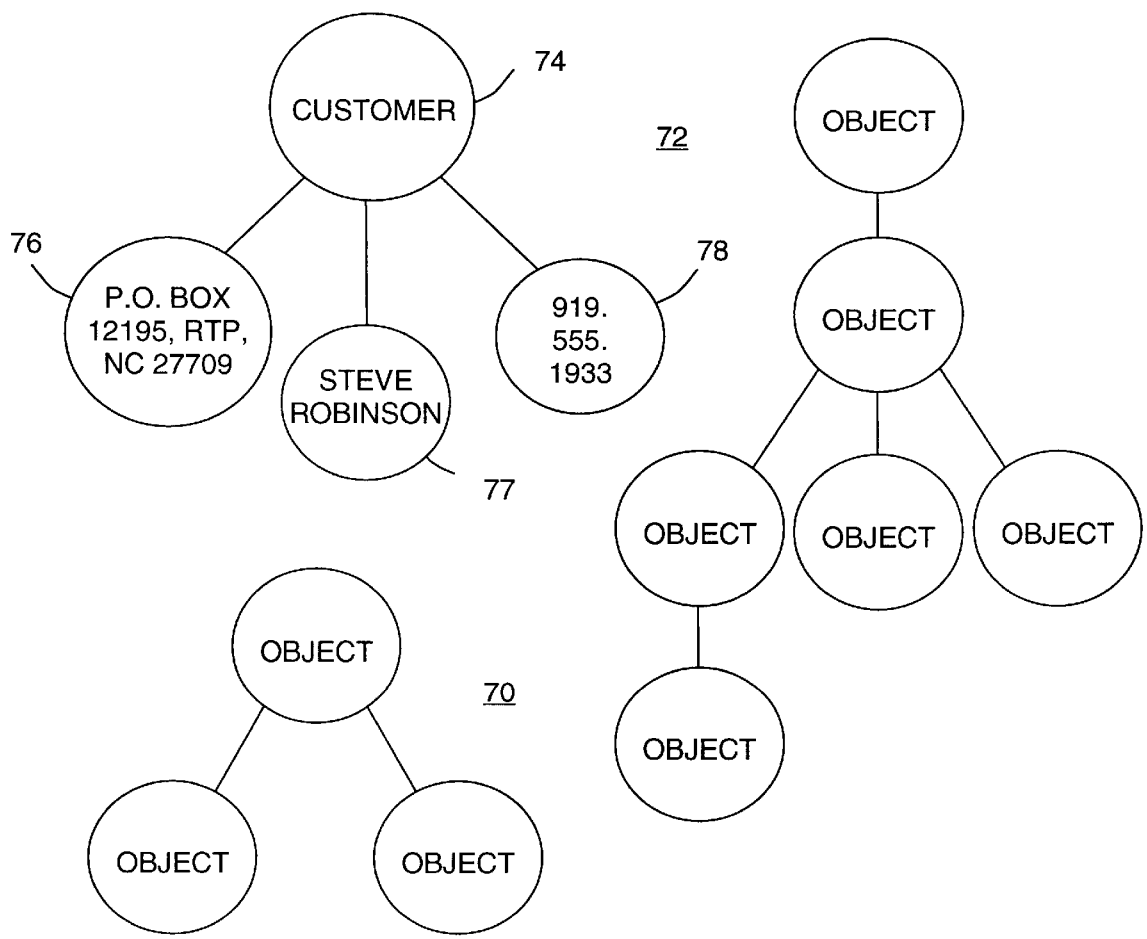

TECHNIQUE FOR MAINTAINING OBJECT INTEGRITY DURING MODIFICATION OF A PERSISTENT STORE OF OBJECTS

BACKGROUND OF THE INVENTION

1. Field of the Invention

The present invention relates to a technique for maintaining the integrity of a set of related objects being modified by an object oriented application. More particularly, the present invention relates to a technique for maintaining the consistency of objects in a persistent store of objects while a user or application is modifying a portion of a persistent store of objects.

2. Description of the Related Art

In certain object oriented programming environments, such as Java and Smalitalk, programs basically comprise a set of instances of classes. (Java is a trademark of Sun Microsystems, Inc.) These instances are often referred to as objects. A class or instance of a class comprises both data (for example, in the form of data members for Java objects and instance variables for Smalitalk objects) and function (in the form of methods). Once an application or program is initiated, execution is carried out by sending messages between objects to request execution of a method in order to obtain data, perform a function, etc.

In Java and Smalltalk, execution of a program requires an appropriate virtual machine, which can be thought of as being analogous to a software computer or a microprocessor. The virtual machine is tailored for the platform (such as OS/2 or Windows), or is tailored for the CPU itself (a Pentium microprocessor, for example) and thus does not need a platform. (OS/2 is a registered trademark of the International Business Machines Corporation (IBM), Windows is a trademark of Microsoft Corporation, and Pentium is a trademark of Intel Corporation.) In either case, this is transparent to the user and her applications, since the user's applications will execute in whatever environment the virtual machine is found/has been tailored for. Thus, the applications or programs are platform independent, in that they are written for execution relative to a virtual machine and are not bound to being executed on a particular platform. So wherever their associated virtual machine is present, the applications or programs will execute. This is one of the key advantages of programming languages like Smalltalk and Java.

One drawback to these languages is the speed at which an application or program written in these languages is executed at runtime. These programs are not compiled in the traditional sense like a C language program, but rather are interpreted at execution (runtime). A number of techniques have been devised to speed up the execution, such as just-in-time compilers, partial compilation of methods which execute basic functions, etc.

Another feature of these languages which effects the execution speed is the requirement that the classes which comprise a program or application must be "loaded" just prior to their execution. This is more of a problem for Java programs than for Smalltalk programs, as the loading process for a Java class when it is first initiated (first required by an application being executed) is a relatively complex and time consuming process; instances of all the classes in a Smalltalk application are loaded when the application is initiated as part of the application's "image".

As object oriented technology, especially Java and Smalltalk technology, becomes more robust and mature, requirements placed upon object oriented applications have increased. It is relatively a simple matter for a single Java or Smalltalk program to be opened and executed all by itself and then terminated when it is no longer required. The logic is self-contained in the program, and the links to necessary data can be dealt with during the creation of the program. But in enterprise environments, the demands are much more severe. This is especially true for objects which contain data which will be used by a number of programs. Data from relational databases can be maintained in the form of objects in order to prevent programmers from having to deal directly with the tables and columns, which are the forms in which data is stored in relational databases, and the relationships between tables and columns.

When data from a relational database or other data store is mapped to an object representation for applications, the data store becomes the place which holds the permanent or persistent state of the object. This data store is referred to as a persistent store. One problem associated with maintaining a persistent store is that data is not static. For example, the information that is maintained in objects of a persistent store can be customer data, employee information, stock market information, etc. This data changes all the time. This data may be updated by traditional batch and transactional applications and by client/server applications.

Accordingly, one problem that must be addressed with respect to persistent stores is how to execute programs with data from objects in a persistent store when the objects in the persistent store are being updated. More particularly, this problem is to prevent the programs from being executed using partially updated data or data that has been entered but not reviewed for accuracy, etc. Coordinating the changes to objects and maintaining the consistency of those objects is a difficult problem. Changes to the objects must be applied in an atomic (simultaneous) and consistent manner. These changes are logically related within the application, representing change from the application's point of view.

One approach that has been used in addressing this problem has been to implement support for "transactions". A transaction represents a logical group of changes to one or more objects that will be applied in an atomic manner. When a transaction is complete, all of the changes are implemented at once, so that all of the affected objects are changed at substantially the same time, or the transaction can be canceled and no changes made to any of the objects.

Most systems which support transactions permit multiple active transactions to be carried out within the system. Traditional transaction systems are effective at managing the consistency of transactions between applications, by controlling the updates to the data store. In object-oriented environments, however, there may be multiple transactions required within a single application, or execution space. In a client/server environment, a single server application may serve many clients, each operating with an associated transaction. In a complex GUI (graphical user interface) application, multiple windows may be displaying or updating common objects using independent transactions. This requires a new level of coordination. The transaction framework must then enforce rules regarding collisions between transactions when two transactions attempt to modify the same data within an object. Such systems maintain the consistency of persistent data with the whole application, but do not control the visibility of changes effected by transactions within the application. This approach requires intervention by the developer to ensure that his transaction/program is not affected by changes being made by another transaction. The application developer must design his application or GUI to ensure that changes from other transactions are not accidentally displayed, and may have to artificially delay changes to objects so as to not affect other active transactions.

Accordingly, a need exists for a technique for a transaction framework which automatically handles potential collisions between transactions and permits execution of applications without data contamination and with a minimum of user intervention.

SUMMARY OF THE INVENTION

An object of the present invention is to provide a technique for permitting modifications to be made to persistent stores of data which do not effect users of the store while the modifications are being made.

Another object of the invention is to allow developers of applications which manipulate objects in a persistent store to use transactions to control the visibility of object modifications.

Yet another object of the invention is to allow developers to structure their applications or graphical user interfaces (GUIs) without having to worry about preventing modifications from other transactions from corrupting their views or calculations.

Other objects and advantages of the present invention will be set forth in part in the description and the drawings which follow, and, in part, will be obvious from the description or may be learned by practice of the invention.

To achieve the forgoing objects, and in accordance with the purpose of the invention as broadly described herein, the present invention provides a technique, method and computer readable code on media for updating an object in a persistent store, comprising first subprocesses for initiating a modification event relative to a target object in a persistent store; second subprocesses for creating a snapshot object for the target object; third subprocesses for modifying the snapshot object with event modifications intended for the target object; and fourth subprocesses for modifying the target object with the event modifications from the snapshot object if the event modifications are committed. The code may also comprise fifth subprocesses for deleting the snapshot object if the event modifications are cancelled; sixth subprocesses for canceling the modification event after the first subprocesses if the target object is already a target of an unrelated event. Additionally, the code may further comprise seventh subprocesses for deleting the snapshot object after said fourth subprocesses is carried out; and eighth subprocesses for determining if a request to access a value in the target object is from a transaction which includes the modification event, and, if so, returning the value from the snapshot object, and, if not, returning the value from the target object.

The present invention will now be described with reference to the following drawings, in which like reference numbers denote the same element throughout.

BRIEF DESCRIPTION OF THE DRAWINGS

FIG. 3A illustrates a class hierarchy;

FIG. 3B illustrates a persistent store which includes an instance of the classes of FIG. 3A;

DESCRIPTION OF THE PREFERRED EMBODIMENT

Figure 1:
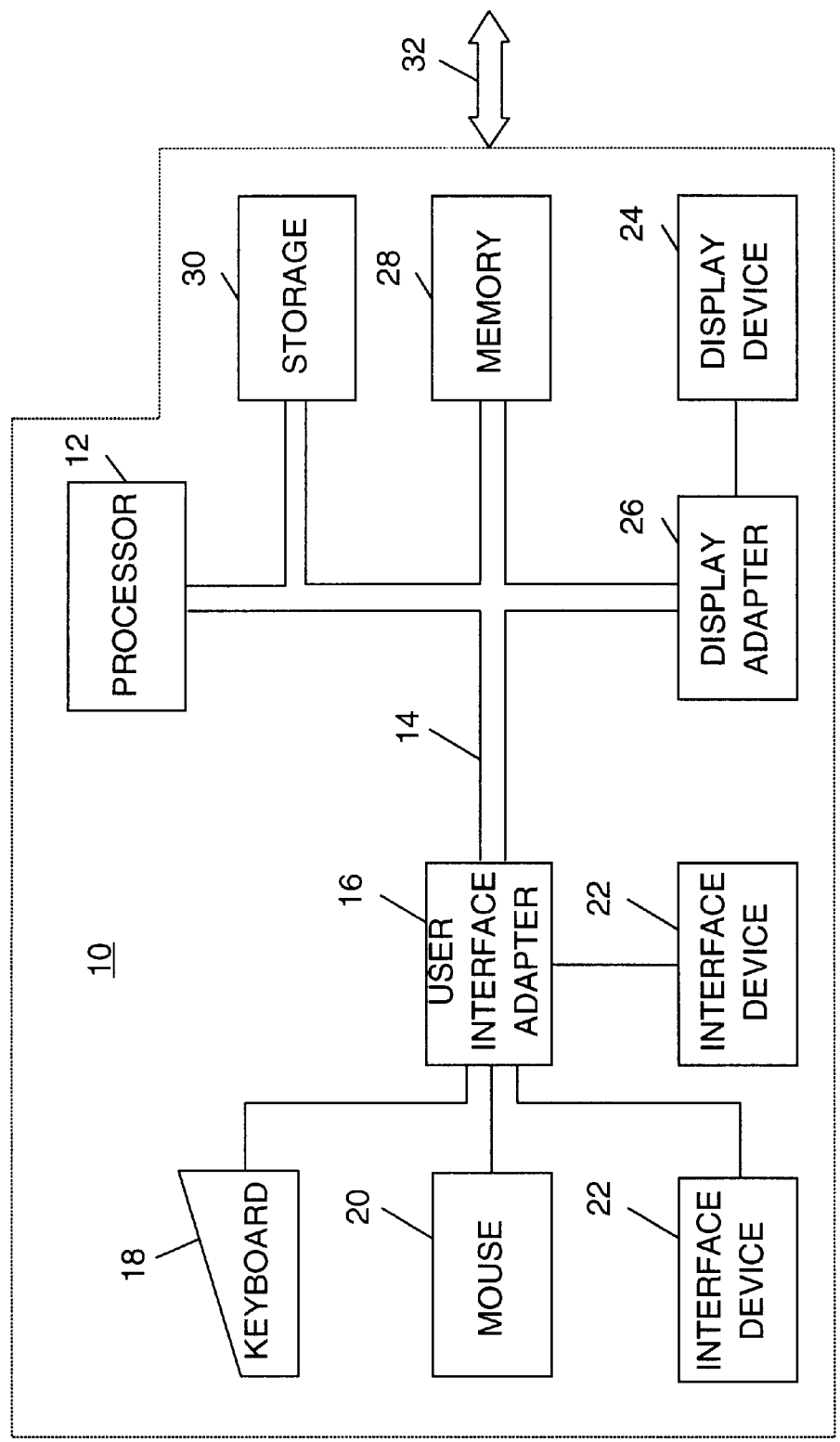
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adaptor 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
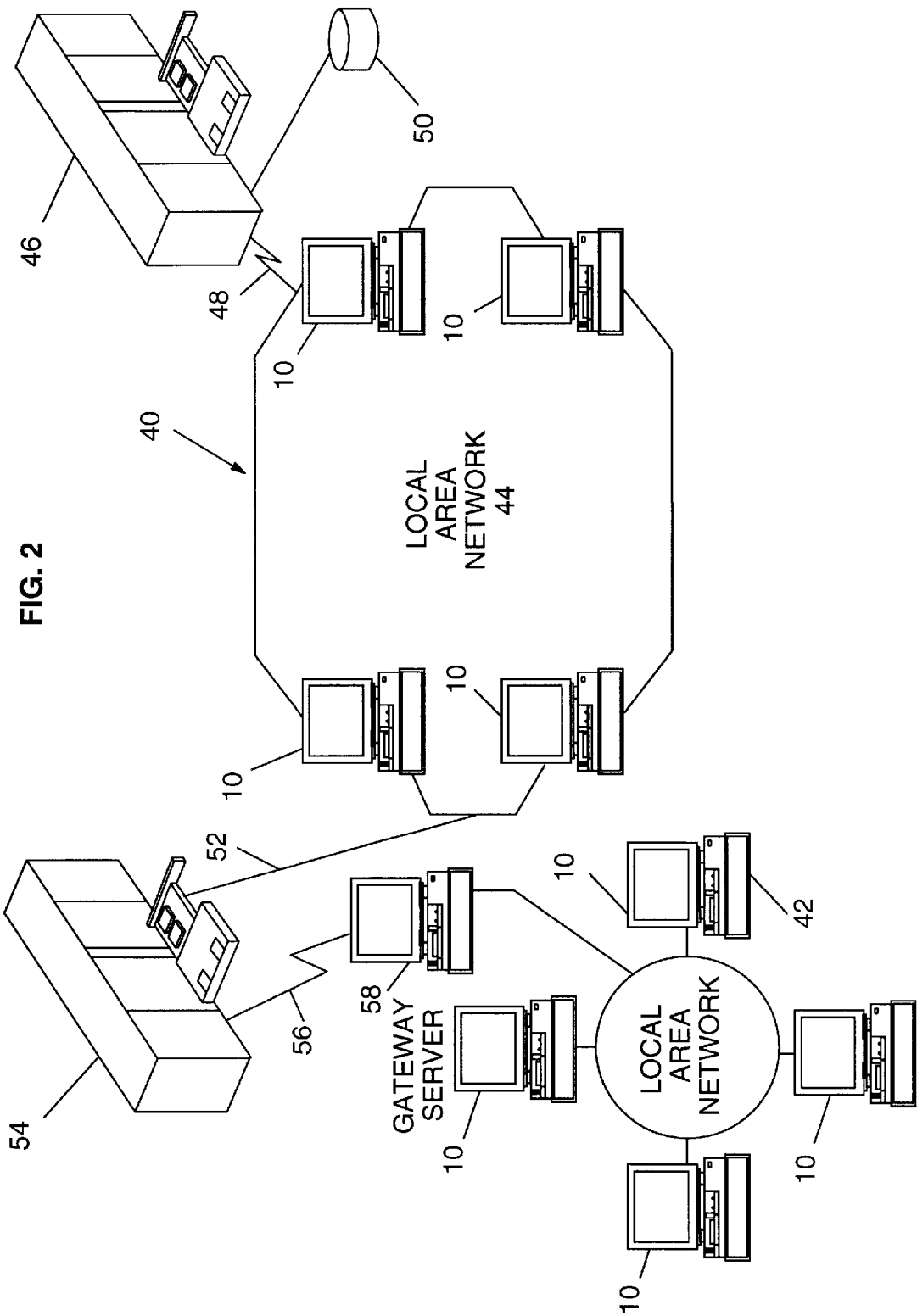
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Applications System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long term storage media of some type, such as a CD-ROM drive or hard drive, which is represented by the long term storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory, or storage of one computer system over a network of some type to other computer systems for use by users of such other systems. The techniques and methods for embodying software program code on physical media and/or distributing software code via networks are well known and will not be further discussed herein.

The preferred embodiment of the present invention will now be discussed with reference to FIGS. 3 through 7.

In the preferred embodiment, the present invention is implemented in the Smalltalk language. Object oriented development environments, such those for the Java, Smalltalk and C++ languages, typically include class libraries for use by developers when programming (developing applications) in the language. Class libraries are reusable sets of reusable classes which typically provide relatively high level functionality. A class is one of the basic building blocks of object oriented languages, and comprises code which represents a combination of function and data. A developer creates an application by adding classes from a class library to the software application being created. A copy or instance of a class is included in the application being created.

A developer may manipulate classes in a predetermined number of ways, depending on the features of the individual language. For example, most object oriented classes have a number of basic characteristics, including encapsulation, polymorphism, and inheritance. Through polymorphism, a software component or class may make a request of another instance of the class without knowing exactly what that component or object is. The object or component which receives the request interprets the request and determines, in accordance with its internal data and functions, how to execute the request. The concept of inheritance permits easy modification of a class. A developer can write a subclass which inherits behavior from all of its parent classes.

All of these properties of object oriented programming, as well as related object orienting programming techniques, are well known to those skilled in the art, and will not be discussed in depth herein. While the present invention will be described in terms of a technique for maintaining object integrity for objects in a persistent store of Smalltalk objects, the present invention may be utilized by a skilled programmer for maintaining object integrity in persistent stores of Java objects or other objects of other languages which encounter the same problem.

The concept of a persistent store is well known, and will not be described in detail herein. A persistent store of objects may be maintained in a location which is accessible by the users, such as a common database which is maintained in, for example, the storage 50 of FIG. 2 or the long term storage 30 of FIG. 1. In any case, as illustrated in FIG. 3, the present invention creates and maintains in memory or storage an object structure for each transaction relative to a persistent store of objects that may cause any of the objects to be modified.

FIG. 3A illustrates a relatively simple class or object network 60 in which a customer class or object 62 has associated therewith specific information related to the customer in the form of instance data contained in three related objects. These three objects include a customer address class 64, a customer name class 66 and customer phone number class 68.

FIG. 3B illustrates a persistent store 70 which includes instances of a number of classes (in the form of objects). An instance of the class network 60 is illustrated by an object hierarchy 72 in which the instance data for a customer object 74 is included as instance data in a customer address object 76, a customer name object 77 and a customer phone number object 78. The instance data in the customer address object 76 is "P.O. Box 12195, RTP, North Carolina 27709", the instance data in the customer name object 77 is "Steve Robinson", and the instance data for the phone number object 78 is "919.555.1933".

Figure 4:
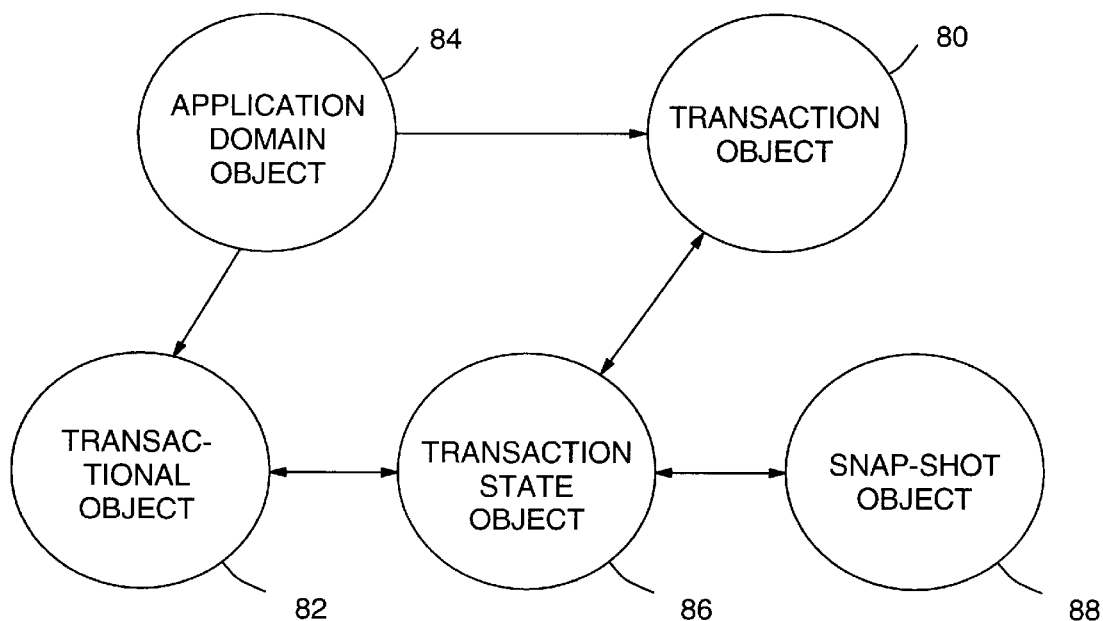
FIG. 4 illustrates the relationship between objects involved with a transaction which maintains the integrity of a persistent store according to the present invention.

Customer information stored in a persistent store 70 such as that identified in the object hierarchy 72 is subject to change. A change or modification is made during a transaction by a user or automated process, program or application which is driving the transaction. The data may be modified by the user or may be modified by the automated process or program. In either case, when a modification or transaction occurs, the present invention is implemented. A transaction is an event, or more typically, a series of events relative to a persistent store which includes causing changes to one or more objects. The present invention takes the form of a class library. When a transaction is initiated, the class library is used to follow the transaction. As actions are carried out during the transaction, instances of classes within the class library are created and modified. As illustrated in FIG. 4, a transaction object 80 is created from the class library when a specific transaction is begun. The transaction object 80 maintains transaction data relative to transactional object(s) in the persistent store 70, such as a change to the phone number of a customer object. The object(s) to which the changes are being made or against which the transaction is occurring is referred to as a transactional object. In FIG. 4, the transactional object for the transaction is represented by transactional object 82. In the situation where the transaction is a change to customer data, such as the phone number stored in the phone number object 78 of the object hierarchy 72 of FIG. 3B, the transactional object 82 is the object hierarchy 72.

Generally, during a transaction, another object must be interacting with the transactional object 82. The interacting object, also called the application domain object, may be a "view" from a graphical user interface of the information stored in the transactional object 82, a report which utilizes the data stored in the transactional object 82, etc. Thus, an application domain object 84 is related to the transaction object 80 in that it drives, initiates or creates the transaction for the transactional object 82 and that the transactional object 82 is affected by the transaction. The transaction object 80 is kept apprised of transactions to the transactional object 82, which it stores as instance data, and thus is aware of the "state" of the transaction. These relationships are graphically illustrated in FIG. 4 by the lines and arrows utilized therein.

A transaction state object 86 is also provided by the system relative to each object to keep track of the state of its corresponding (transactional) object 82; that is, whether the application domain object 84 is attempting to modify or delete the transactional object or replace the transactional object with a new transactional object. Relative to the modification of a value of an object in the persistent store, its corresponding transactional state object has one of two states, "modified" or "retrieved". "Modified" indicates that a setter method has been invoked for its corresponding object. "Retrieved" indicates that the object is not presently undergoing modification. The transaction state object 86 receives messages from the transaction object 80, such that when a change to the state of the transactional object 82 is attempted, the transaction state object 86 is informed of this change by the transaction object 80. The transaction state object 86 then causes a snap shot object 88 to be created. The snap shot object 88 is a copy of the transactional object 82, but any modifications (change of state) intended for the transactional object 82 are applied to the snap shot object 88. Thus, the transactional object 82 is maintained in its original state from prior to the beginning of this transaction. At the end of the transaction, if the user decides to keep the changes made to the transactional object 82 (which are found in the snap shot object 88), the contents of the snap shot object 88 are copied to the transactional object 82. But until that time, the original transactional object 82 is maintained within the persistent store for use by users of the persistent store.

The actual process for carrying out the present invention will now be described with reference to the flow chart of FIG. 5. While the process is for the most part discussed with respect to a transaction which is modifying a single object, it should be noted that the transaction may modify any number of objects.

Figure 5A:
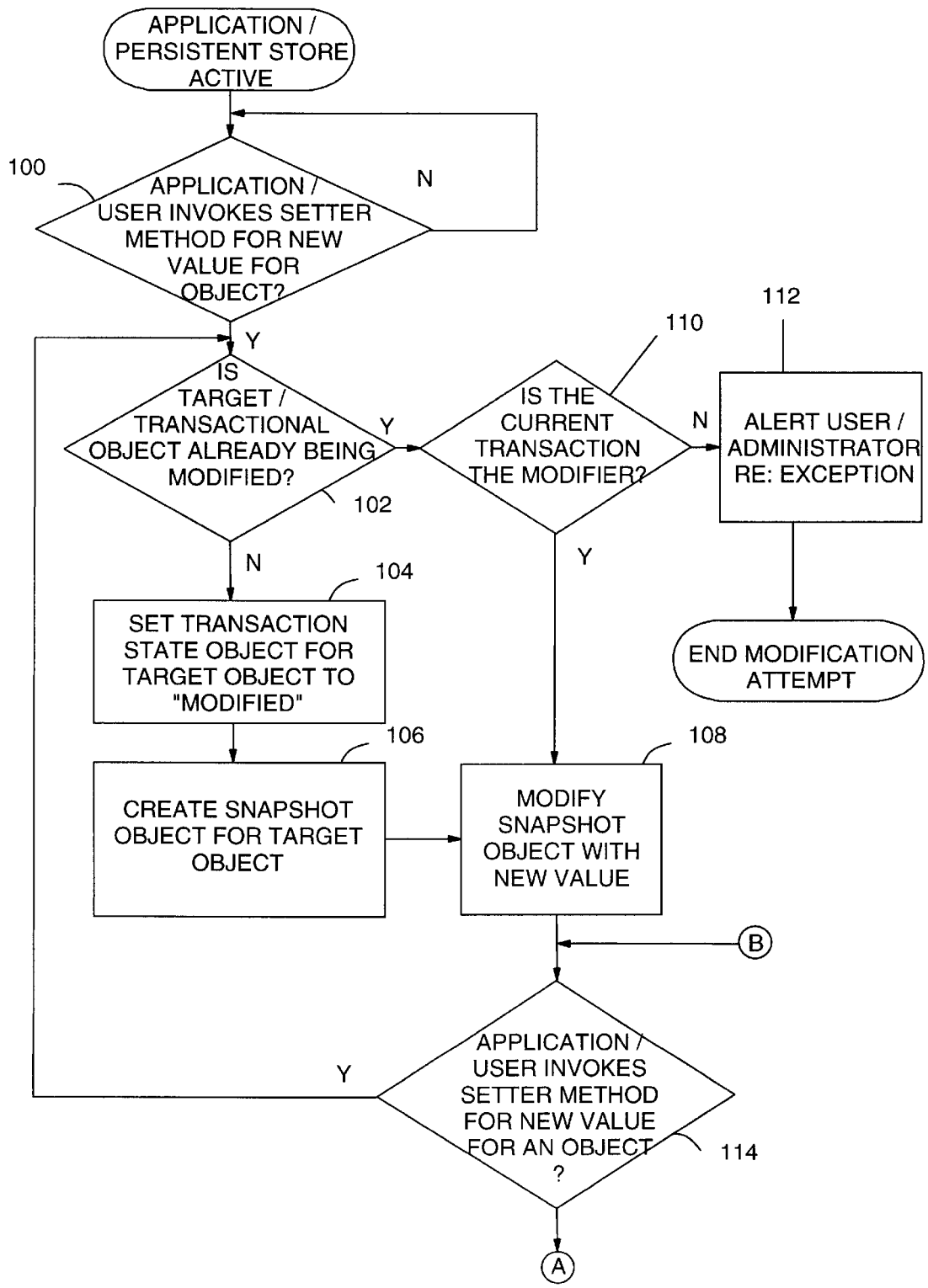
FIGS. 5A–5B constitute a flowchart illustrating the process of performing a transaction against an object in a persistent store according to the present invention.
Figure 5B:
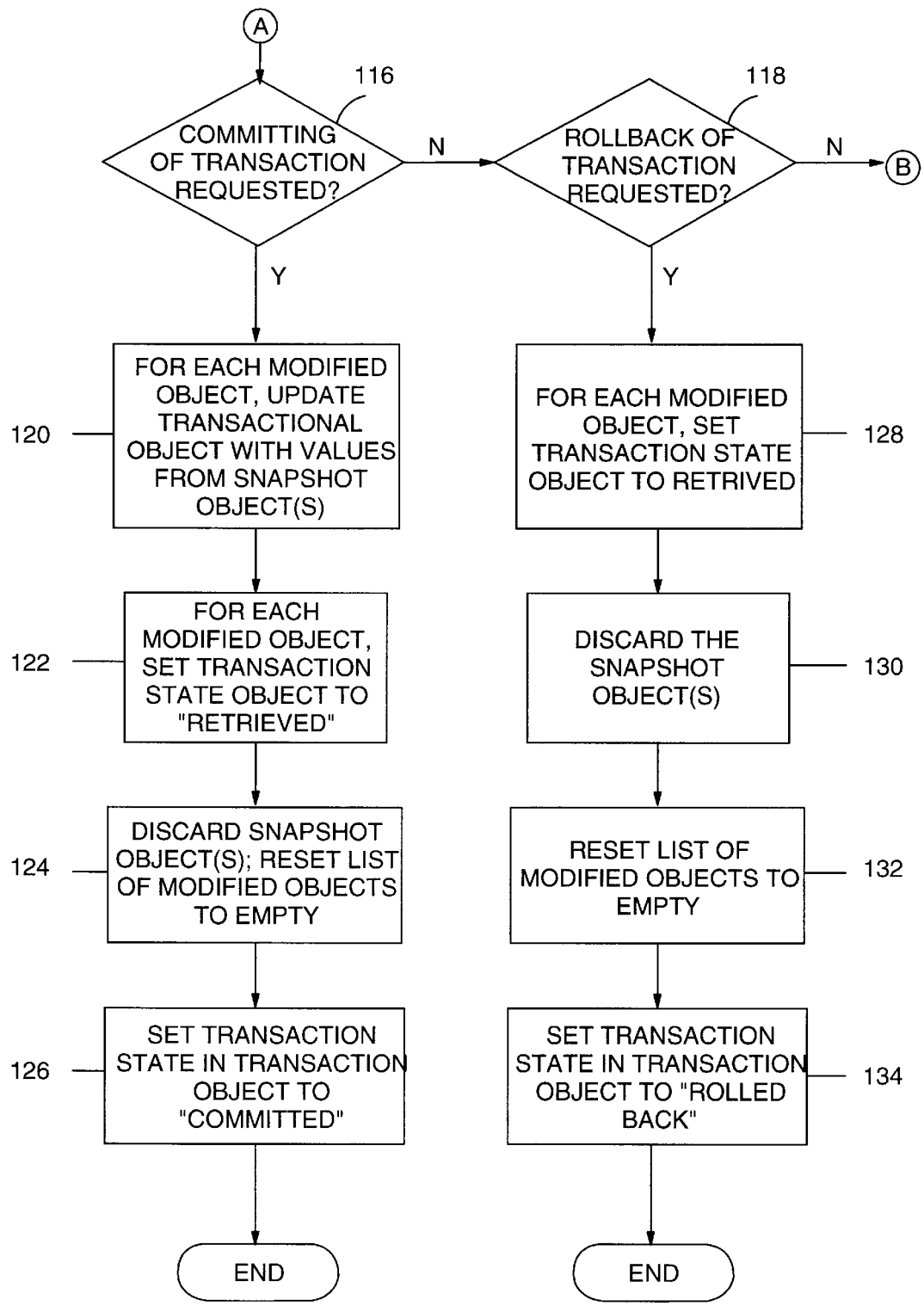

Referring now to FIG. 5, when a user is interacting with an active persistent store or an application is being used to update an active persistent store during a transaction, the present invention is invoked if it is determined in Step 100 that a setter method has been invoked for setting a new value within an object within the persistent store (Step 100). As discussed above with reference to FIG. 4, the target object for which the new value is being set is designated for purposes of this invention as the transactional object 82. The object which is invoking a setter method for setting a new value within a transactional object 82 is the application domain object 84.

Processing then proceeds to Step 102, in which it is determined whether the transactional object 82 is already being modified (undergoing a transaction). If it is determined in Step 102 that the transactional object 82 is not presently undergoing modification, that is, that the state of the transaction state object 86 for the object which is the target of the transaction is not set to "modified", then processing proceeds to Step 104. In Step 104, a transaction object 80 is created for the transaction if this is the first event of the transaction. The transaction object 80 will control the transaction relative to the transactional (target) object 82, and the transaction object 80 causes the state value in the transaction state object 86 to be set to "modified." The transaction object 80 has three possible states: active, committed and rolled back. At this time, the state is set to "active". The other states will be discussed below. Next, the snap shot object 88 is created for the transactional object 82 (Step 106) by making a copy of the transactional object 82. Thus, at first, the snap shot object 86 is a copy of the transactional object 82. Data in the transaction object 80 includes a list of modified objects, and the target object 82 is added to this list. Processing then proceeds to Step 108, in which the transaction object 80 causes transaction changes intended for the target object 82 to be made to the snap shot object 88 instead. The setter method which was originally invoked by the transaction to changes the appropriate value in the snap shot object 88.

Figure 6A:
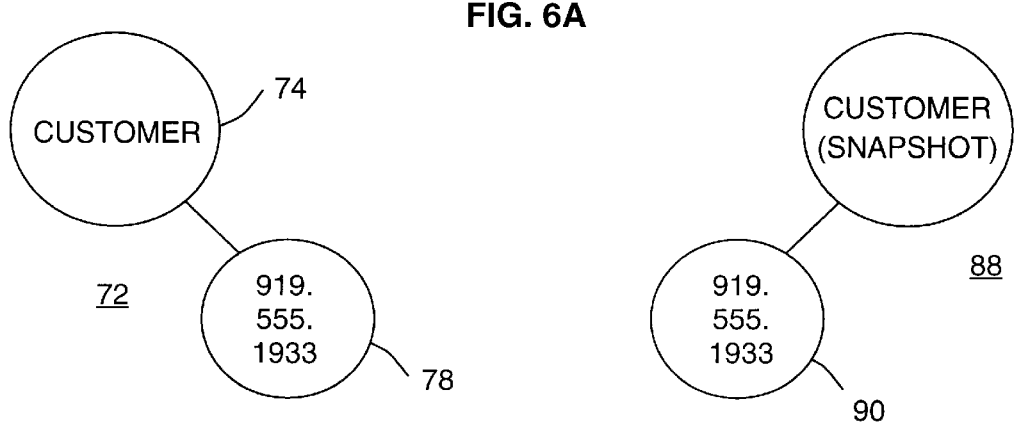
FIGS. 6A–6D illustrate the value stored in an object which is the subject of a transaction and in its corresponding snapshot object during the course of a transaction.

The transaction to this point is illustrated in FIG. 6A. In FIG. 6A, the transactional object 82 is the customer object hierarchy 72 from the persistent store 70 from FIG. 3B. The only data that is to be modified in this example is in the customer phone number object 78, so only the customer object 74 and customer phone number object 78 from the object hierarchy 72 are illustrated in FIG. 6A. When the snapshot object 88 is initially created in Step 106, it is identical to its associated original transactional object. Thus, in FIG. 6A, the value in the customer phone number object 78 of the target customer object hierarchy 72 is the same as the value in a customer phone number object 90 of the corresponding snap shot object 88. Then, as per Step 108, the value of the snapshot object 88 is modified with the new value by the setter method invoked by the transaction.

Alternatively, it may be determined in Step 102 that the target object 82 is already the subject of a transaction. This is done by determining if a transaction state object 86 for the transactional object 82 indicates a modified state. If so, processing proceeds to Step 110, in which it is determined whether the current transaction is the transaction which is modifying the transactional object 82 (and thus is responsible for causing a setting in the transaction state object 86 to have been set to "modify".) If it is determined in Step 110 that the current transaction is not presently modifying the transactional object 82, then processing proceeds to Step 112, in which an exception is registered, the user or the administrator is alerted, and the modification attempt (transaction) is terminated. This termination of the modification attempt is carried out in order to prevent two simultaneous modifications from being performed to the data of the target object at the same time, which runs the very serious risk of data corruption and, if permitted, would raise the new problem of how to reconcile what would possibly be two conflicting new sets of data for the same object.

Figure 6B:
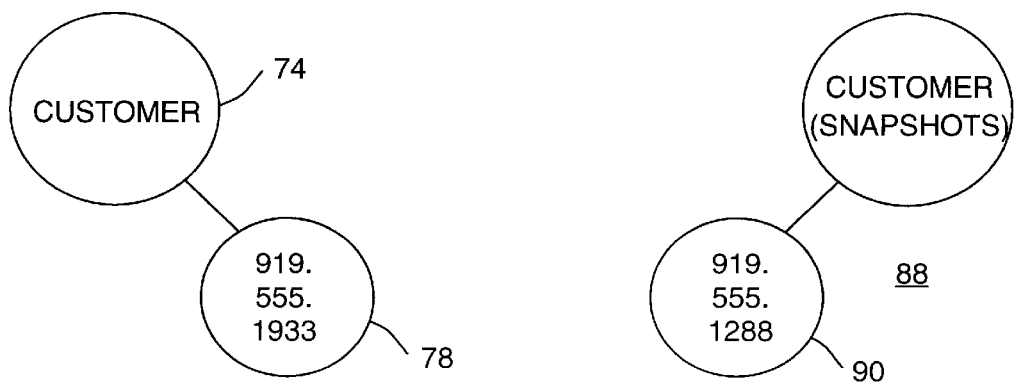

On the other hand, if it is determined in Step 110 that the current transaction is the modifying transaction for the transactional object 82, processing proceeds to Step 108, in which the appropriate data in the snap shot object 88 is updated with the new value. As illustrated in FIG. 6B, the customer phone number object 90 of the snapshot object 88 has been updated to include a new value for the customer value in accordance with the setter method.

Following Step 108, a number of events may happen. These possibilities are identified by Steps 114, 116 and 118. First, as identified in Step 114, the transaction may continue, and at some point may invoke a setter method for a new value to be associated with an object in the persistent store. The object may be the transactional object discussed above or a different object. If so, processing returns to Step 102, and processing as per Steps 102–112 is carried out for the object which is the target of the newly invoked setter method.

As per Step 116, the user or application which is driving the transaction may be satisfied with the changes that have been made and decide to permanently commit the transaction modifications intended for the transactional object(s) to the persistent store. It should be noted that the user or application may first review the modified values in the snapshot object(s) 88 to make sure the new values are appropriate, utilizing the process to be described below relative to FIG. 7. Referring once again to FIG. 5, upon a request to commit the transaction, processing proceeds to Step 120, in which the values contained in the snapshot object which corresponds to each transactional object listed in the list of modified objects in the transaction object 80 are copied to the transactional object(s), replacing the original values as appropriate. Then, in Step 122, the transaction state value in the transaction state object 86 for each transactional object is changed to "retrieved", to indicate that the modification has been applied to the corresponding transactional object. The transaction object 80 discards the snapshot object(s) and the list of modified objects is reset to empty (Step 124). Finally, the transaction state of the transaction state object(s) 86 is set to "retrieved," which will indicate that no snapshot object exists for the object, and the state of the transaction object 80 is set to "committed", which indicates that the transaction is complete (Step 126). The modification to the objects in the persistent store relative to this transaction is then considered to be completed, as is this transaction. The persistent store now includes the modified transactional (target) object. The new values in the transactional object are now available to all users of the persistent store.

Figure 6C:
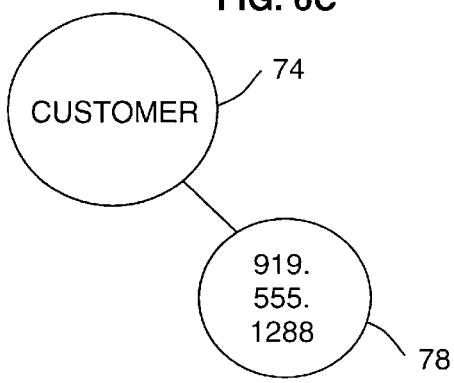

The result of Steps 122 and 124 is also illustrated in FIG. 6C, in which the snap shot object 88 has been discarded, and the data in the customer phone number object 78 has been updated to reflect commitment of the modification originally made by the transaction to the snapshot object 88.

Figure 6D:
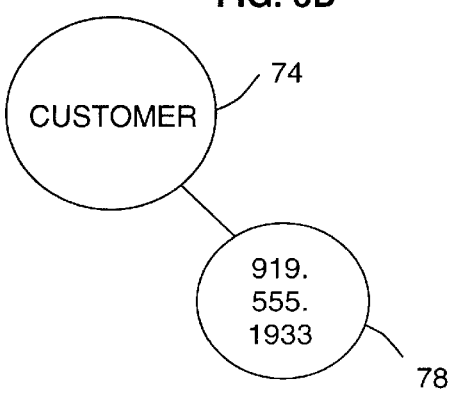

The third possible user option is identified in Step 118, whereby the user or application decides that the changes that have been made in the transaction are not desired, and indicates that the value originally maintained within the transactional object(s) is desired to be kept. In this case, processing proceeds to Step 128, in which the transaction state in the transaction state object 86 for each transactional object is changed to "retrieved". Next, the snapshot object 88 (FIG. 6B) is discarded (Step 130), as illustrated in FIG. 6D, and the list of modified objects in the transaction object 80 is reset to empty (Step 132). Following Step 132, the transaction state within the transaction object 80 is set to "rolled back" (Step 134) to indicate that the transaction is complete. Processing for this transaction relative to the value invoked by the setter method in Step 100 is now complete. The value of the transactional object 72 following Step 134 is illustrated in FIG. 6D, in which the customer phone number object 78 includes the data that was originally included in the customer phone number object 78.

Figure 7:
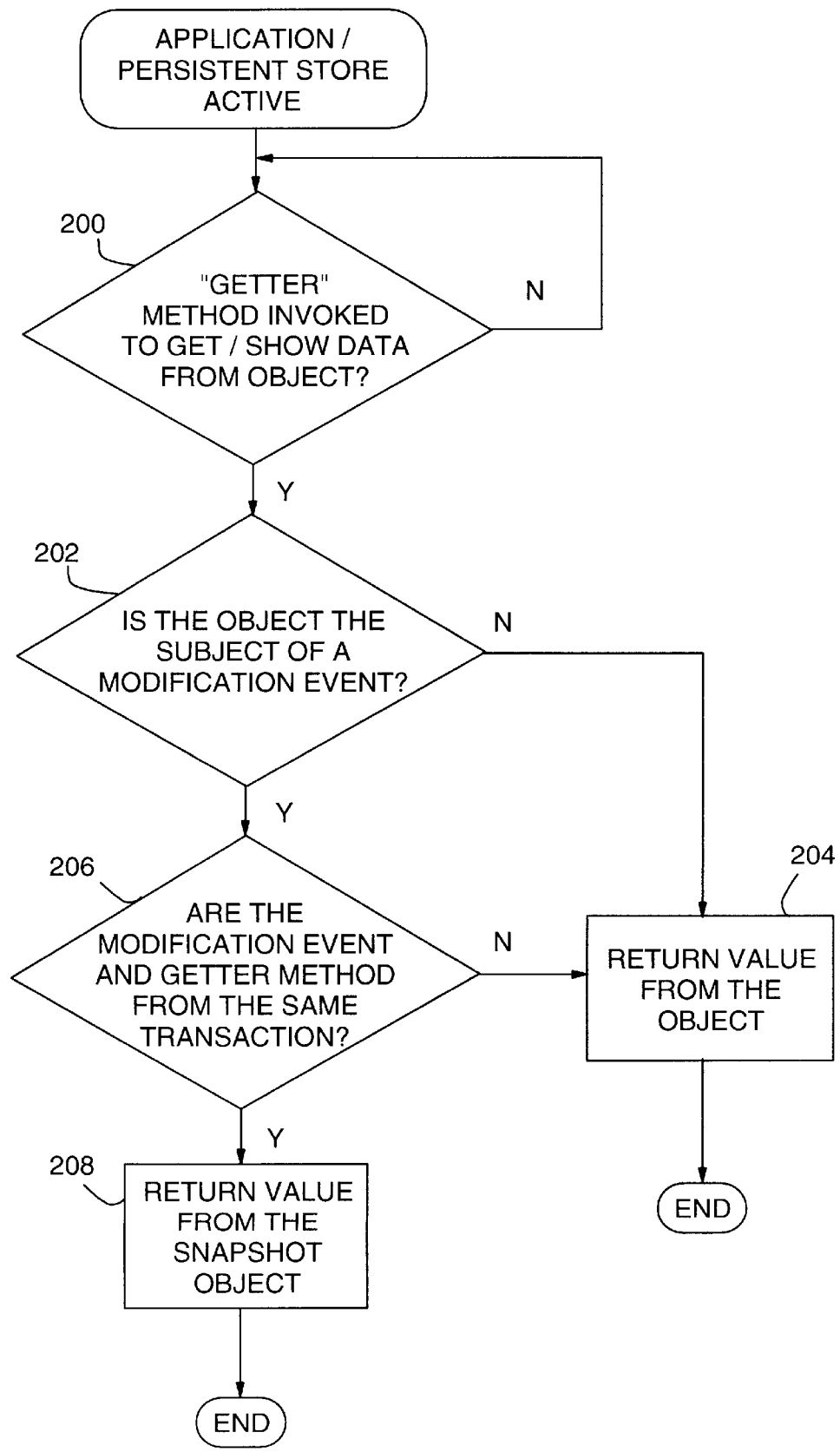
FIG. 7 is a flowchart of a process for providing an appropriate value to a requestor for an object which is the subject of an active transaction.

FIG. 7 illustrates the processing that has carried out when an attempt is made to view a transactional object while the transactional object is the subject of a transaction. Upon the invocation of a "getter" method (a method which causes data in a target object to be retrieved) to retrieve or show data from an object which is the target of the getter method (Step 200), processing proceeds to Step 202. The data may be retrieved for display in a graphical user interface, for use in an application, etc., as is routinely done with any data. In Step 202, it is determined whether or not the target object of the getter method is a modified transactional object by checking the state of its transaction state object. If not, processing proceeds to Step 204 and the value of the target object is returned to the user or application which caused the invocation of the getter method as appropriate and in accordance with known techniques, and processing ends.

If it is determined in Step 202 that the target object is the subject of a transaction, that is, if the transaction state object associated therewith has a state value is set to "modified", processing proceeds to Step 206. In Step 206, it is determined whether the transaction which invoked the getter method in Step 200 is also the transaction which caused the transaction state object 86 to be set to "modified" in the first place. This is determined by checking to see if a value in the transaction state object 86 which identifies its originating transaction indicates that the transaction which invoked the getter method is the same as the originating transaction that is modifying the target object. If it is determined that the transactions are different, processing proceeds to Step 204, and the value in the transactional object 82 (the original value) is returned to the user or application in response to the getter method, and processing ends relative to the getter method. Alternately, if it is determined in Step 206 that the transaction which invoked the getter method is also the originating transaction which is modifying to the value of the transactional object 82 (as reflected in the value stored in its corresponding snapshot object 88), processing proceeds to Step 208. In Step 208, the value returned to the user or application in response to the invocation of the getter method is the modified value for the transactional object 82 as contained in its corresponding snapshot object 88. Processing relative to the getter method then ends.

While the present invention has been described relative to a persistent store of Smalltalk objects, the basic techniques described herein may be applicable to many types of object oriented languages. Thus, while the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and such modifications as fall within the spirit and scope of the invention.

We claim:

1. A method for updating an object in a persistent store, comprising the steps of:

initiating a modification event relative to a target object in a persistent store;

creating a snapshot object for the target object;

modifying the snapshot object with event modifications intended for the target object;

modifying the target object with the event modifications from the snapshot object if the event modifications are committed; and determining if a request to access a value in the target object is from a transaction which includes the modification event, and if so, returning the value from the snapshot object, and, if not, returning the value from the target object.

2. In a computing environment, a system for updating an object in a persistent store comprising:

means for initiating a modification event relative to a target object in a persistent store;

means for canceling the modification event if the target object is already a target of an unrelated event;

means for creating a snapshot object for the target object if the target object is not already a target of an unrelated event;

means for modifying the snapshot object with event modifications intended for the target object; and means for modifying the target object with the event modifications from the snapshot object if the event modifications are committed.

3. A system for updating an object in a persistent store according to claim 2, further comprising:

means for deleting the snapshot object if the event modifications are canceled.

4. A system for updating an object in a persistent store according to claim 2, further comprising:

means for deleting the snapshot object after the event modifications are committed by said means for modifying the target object.

5. Computer readable code stored on computer readable medium for updating an object in a persistent store, comprising:

first subprocesses for initiating a modification event relative to a target object in a persistent store;

second subprocesses for canceling the modification event if the target object is already a target of an unrelated event;

third subprocesses for creating a snapshot object for the target object if the target object is not already a target of an unrelated event;

fourth subprocesses for modifying the snapshot object with event modifications intended for the target object; and fifth subprocesses for modifying the target object with the event modifications from the snapshot object if the event modifications are committed.

6. Computer readable code according to claim 5, further comprising:

sixth subprocesses for deleting the snapshot object if the event modifications are canceled.

7. Computer readable code according to claim 5, further comprising:

sixth subprocesses for deleting the snapshot object after said fifth subprocesses is carried out.

8. Computer readable code stored on computer readable medium for updating an object in a persistent store, comprising:

first subprocesses for initiating a modification event relative to a target object in a persistent store;

second subprocesses for creating a snapshot object for the target object;

third subprocesses for modifying the snapshot object with event modifications intended for the target object;

fourth subprocesses for modifying the target object with the event modifications from the snapshot object if the event modifications are committed; and fifth subprocesses for determining if a request to access a value in the target object is from a transaction which includes the modification event, and, if so, returning the value from the snapshot object, and, if not, returning the value from the target object.

\* \* \* \* \*